United States Patent
Yan

(10) Patent No.: US 9,894,082 B2
(45) Date of Patent: Feb. 13, 2018

(54) METHOD, APPARATUS, AND COMPUTER PROGRAM PRODUCT FOR MANAGING UNWANTED TRAFFIC IN A WIRELESS NETWORK

(75) Inventor: Zheng Yan, Espoo (FI)

(73) Assignee: Nokia Technologies Oy, Espoo (FI)

( * ) Notice: Subject to any disclaimer, the term of this patent is extended or adjusted under 35 U.S.C. 154(b) by 181 days.

(21) Appl. No.: 13/979,056

(22) PCT Filed: Jan. 18, 2011

(86) PCT No.: PCT/IB2011/050220
§ 371 (c)(1),
(2), (4) Date: Jul. 10, 2013

(87) PCT Pub. No.: WO2012/098429
PCT Pub. Date: Jul. 26, 2012

(65) Prior Publication Data
US 2013/0291105 A1    Oct. 31, 2013

(51) Int. Cl.
*H04L 29/06* (2006.01)
*G06Q 10/06* (2012.01)
(Continued)

(52) U.S. Cl.
CPC .......... *H04L 63/1408* (2013.01); *G06F 21/56* (2013.01); *G06Q 10/06* (2013.01);
(Continued)

(58) Field of Classification Search
CPC ....................................................... H04L 63/14
(Continued)

(56) References Cited

U.S. PATENT DOCUMENTS

| 8,423,057 B1* | 4/2013 | Upadhyay ............... H04W 4/12 455/412.2 |
| 2003/0163729 A1 | 8/2003 | Buchegger |

(Continued)

FOREIGN PATENT DOCUMENTS

| CN | 101572701 A | 11/2009 |
| WO | WO-2007136665 A2 | 11/2007 |

OTHER PUBLICATIONS

International Search Report received for corresponding Patent Cooperation Treaty Application No. PCT/IB2011/050220, dated Oct. 18, 2011, 5 pages.
(Continued)

*Primary Examiner* — Yin-Chen Shaw
*Assistant Examiner* — Darshan Dhruv
(74) *Attorney, Agent, or Firm* — Mintz Levin Cohn Ferris Glovsky and Popeo, P.C.

(57) ABSTRACT

Various methods for unwanted traffic control in a wireless network are provided. One example method may include detecting an occurrence of unwanted content as indicated by receipt of a complaint about a content item provided by a source device, wherein the complaint may be received from a remote mobile device or generated locally based on a local detection. The example method may further include determining a trust value for the source device based at least on the complaint, determining that the source device is a distrusted device based at least on a comparison between the trust value and a trust threshold value, and causing traffic from the source device to be controlled as unwanted traffic. Similar and related example methods, example apparatuses, and example computer program products are also provided.

23 Claims, 4 Drawing Sheets

(51) Int. Cl.
*G06Q 50/00* (2012.01)
*G06Q 50/32* (2012.01)
*G06F 21/56* (2013.01)

(52) U.S. Cl.
CPC .............. *G06Q 50/01* (2013.01); *G06Q 50/32* (2013.01); *H04L 63/1441* (2013.01); *H04L 2463/146* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 2005/0021740 A1* | 1/2005 | Bar | ..................... | H04L 63/0236 709/224 |
| 2005/0086300 A1* | 4/2005 | Yeager | ................... | G06F 9/544 709/204 |
| 2006/0253584 A1* | 11/2006 | Dixon | ..................... | G06Q 30/02 709/225 |
| 2007/0156886 A1* | 7/2007 | Srivastava | ........... | G06Q 10/109 709/224 |
| 2007/0208613 A1* | 9/2007 | Backer | ................. | G06Q 10/107 715/234 |
| 2007/0275741 A1* | 11/2007 | Bian | ..................... | G06F 21/552 455/466 |
| 2008/0084294 A1* | 4/2008 | Zhiying | ................. | G08B 21/12 340/539.22 |
| 2008/0175266 A1 | 7/2008 | Alperovitch et al. | | |
| 2008/0256619 A1* | 10/2008 | Neystadt | ............... | G06F 21/552 726/11 |
| 2008/0263637 A1* | 10/2008 | Nonaka et al. | ................... | 726/4 |
| 2008/0320095 A1* | 12/2008 | Pearson | ................. | H04L 51/12 709/207 |
| 2009/0150497 A1* | 6/2009 | McAfee et al. | ............... | 709/206 |
| 2009/0164574 A1* | 6/2009 | Hoffman | ................. | H04W 4/02 709/204 |
| 2009/0328209 A1 | 12/2009 | Nachenberg | | |
| 2010/0235886 A1* | 9/2010 | Muller et al. | ..................... | 726/4 |
| 2010/0325272 A1* | 12/2010 | Lloyd | ................. | H04L 12/2602 709/224 |
| 2011/0038287 A1* | 2/2011 | Agarwal | ............. | H04L 12/5865 370/310 |
| 2011/0078775 A1 | 3/2011 | Yan | | |
| 2011/0138467 A1* | 6/2011 | Macwan | ............... | G06F 21/554 726/24 |
| 2012/0030293 A1* | 2/2012 | Bobotek | ................ | G06Q 10/10 709/206 |

OTHER PUBLICATIONS

Qureshi, B. et al. "M.-Trust: A Trust Management Scheme for Mobile P2P Networks," Embedded and Ubiquitous Computing (EUC), 2010 IEEE/IFIP 8th International Conference on , pp. 476-483, Nov. 12, 2010, URL: http:ieeexplore.ieee.org/stamp/stamp.jsp?tp=&arnumber-5703564&isnumber=5703490.

Baras, J.S. et al. "Cooperative games, phase transitions on graphs and distributed trust in MANET", Decision and Control, 2004. CDC. 43rd IEEE Conference on vol. 1, No. 93-98 vol. 1, Dec. 14-17, 2004.

Jun Bi et al. "A Trust and Reputation based Anti-SPIM Method," INFOCOM 2008. The 27th Conference on Computer Communications. IEEE, vol. No. 2485-2493, Apr. 13-18, 2008.

Kulesza Natalia, BSc Thesis, Imperial College of London Department of Computing 2009.

Han, Asung, et al. "Semantic analysis of user behaviors for detecting spam mail." Semantic Computing and Applications, 2008. IWSCA'08. IEEE International Workshop on. IEEE, 2008.

* cited by examiner

METHOD, APPARATUS, AND COMPUTER PROGRAM PRODUCT FOR MANAGING UNWANTED TRAFFIC IN A WIRELESS NETWORK

RELATED APPLICATION

This application was originally filed as PCT Application No. PCT/IB2011/050220 filed Jan. 18, 2011.

TECHNICAL FIELD

Various embodiments relate generally to wireless network management, and, more particularly, relate to a method, apparatus, and computer program product for management of unwanted traffic within a wireless network (e.g., a mobile ad hoc network).

BACKGROUND

Wireless communications network technology continues to evolve allowing for new and unique user applications that can leverage wireless networks. Via these new technologies, users can become increasingly interconnected to, for example, share data, opinions, experiences, and the like. As such, users of a wireless network may send and receive desirable information on their mobile device to be considered by the user. While this level of connectivity may be used to advantage the users, it may also be exploited by malware or the like to cause the undesirable transfer of information within the network. Undesirable or unwanted traffic can cripple the network by repeatedly spawning additional sources and by usurping network resources thereby slowing the overall operation of the network.

SUMMARY

Example methods, example apparatuses, and example computer program products are described herein that provide for management of unwanted traffic in a wireless network. One example method may include detecting an occurrence of unwanted content as indicated by receipt of a complaint about a content item provided by a source device, wherein the complaint is received from a remote mobile device or generated locally based on a local detection. The example method may further include determining a trust value for the source device based at least on the complaint, where the complaint indicates a likelihood that the content item is unwanted content. The example method may include determining that the source device is a distrusted device based at least on a comparison between the trust value and a trust threshold value, and causing traffic from the source device to be controlled as unwanted traffic. Another example embodiment is a computer program configured to implement the example method.

An additional example embodiment is an apparatus configured to manage unwanted traffic. The example apparatus may comprise at least one processor and at least one memory including computer program code, where the at least one memory and the computer program code are configured to, with the at least one processor, cause the apparatus to perform various functionalities. In this regard, the example apparatus may be caused to detect an occurrence of unwanted content as indicated by receipt of a complaint about a content item provided by a source device, wherein the complaint is received from a remote mobile device or generated locally based on a local detection. The example apparatus may also be caused to determine a trust value for the source device based at least on the complaint, where the complaint indicates a likelihood that the content item is unwanted content. The example apparatus may also be caused to determine that the source device is a distrusted device based at least on a comparison between the trust value and a trust threshold value, and cause traffic from the source device to be controlled as unwanted traffic.

Another example embodiment is a computer program product comprising at least one non-transitory computer readable medium having computer program code stored thereon, wherein the computer program code, when executed by an apparatus (e.g., one or more processors), causes an apparatus to perform various functionalities. In this regard, the program code may cause the apparatus to detect an occurrence of unwanted content as indicated by receipt of a complaint about a content item provided by a source device, wherein the complaint is received from a remote mobile device or generated locally based on a local detection. The example program code may also cause the apparatus to determine a trust value for the source device based at least on the complaint, where the complaint indicates a likelihood that the content item is unwanted content. They example program code may also cause the apparatus to determine that the source device is a distrusted device based at least on a comparison between the trust value and a trust threshold value, and cause traffic from the source device to be controlled as unwanted traffic.

Another example apparatus comprises means for detecting an occurrence of unwanted content as indicated by receipt of a complaint about a content item provided by a source device, wherein the complaint is received from a remote mobile device or generated locally based on a local detection. The example apparatus may further include means for determining a trust value for the source device based at least on the complaint, where the compliant indicates a likelihood that the content item is unwanted content. The apparatus may also comprise means for determining that the source device is a distrusted device based at least on a comparison between the trust value and a trust threshold value, and means for causing traffic from the source device to be controlled as unwanted traffic.

BRIEF DESCRIPTION OF THE DRAWINGS

Figure 1:
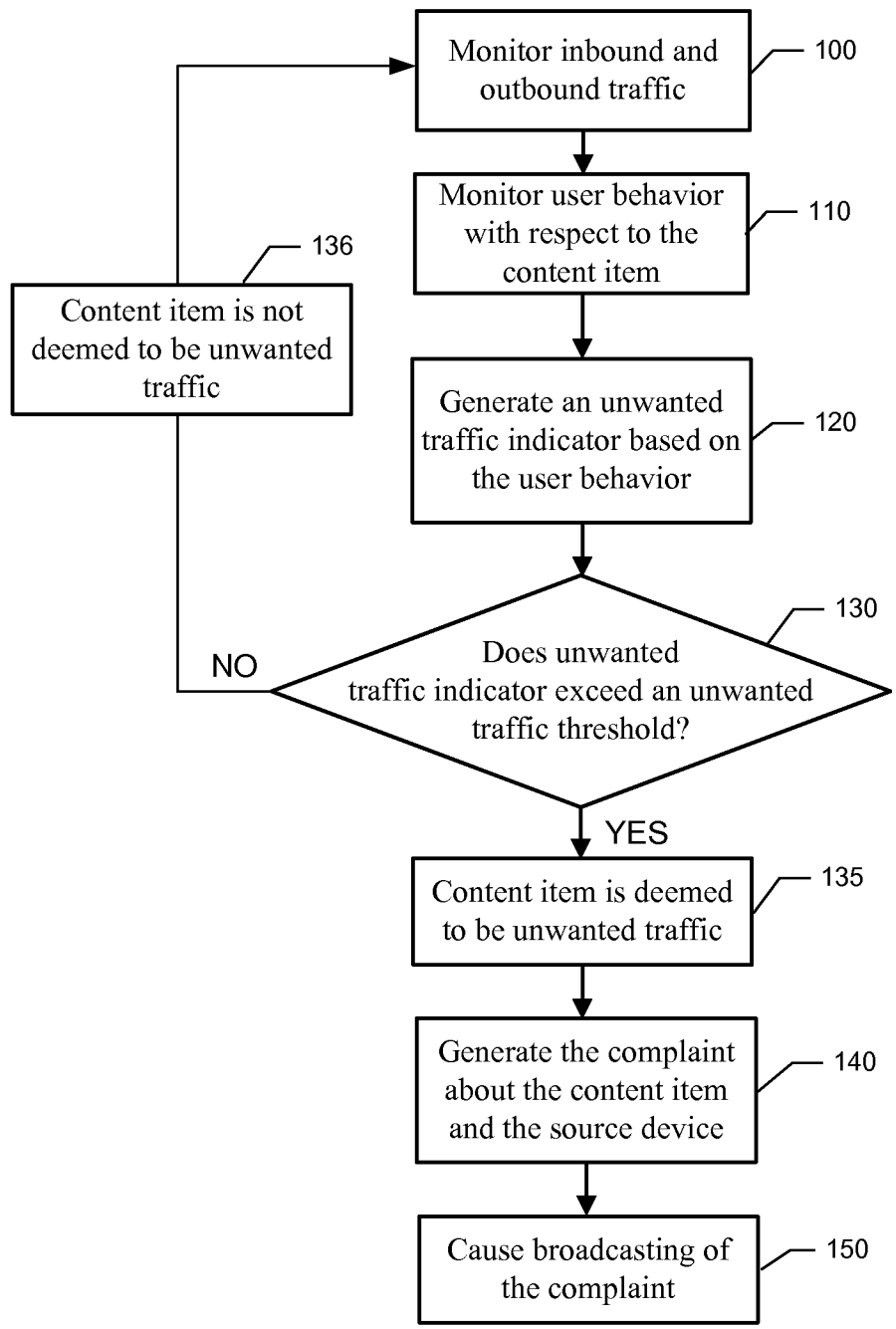
Figure 2:
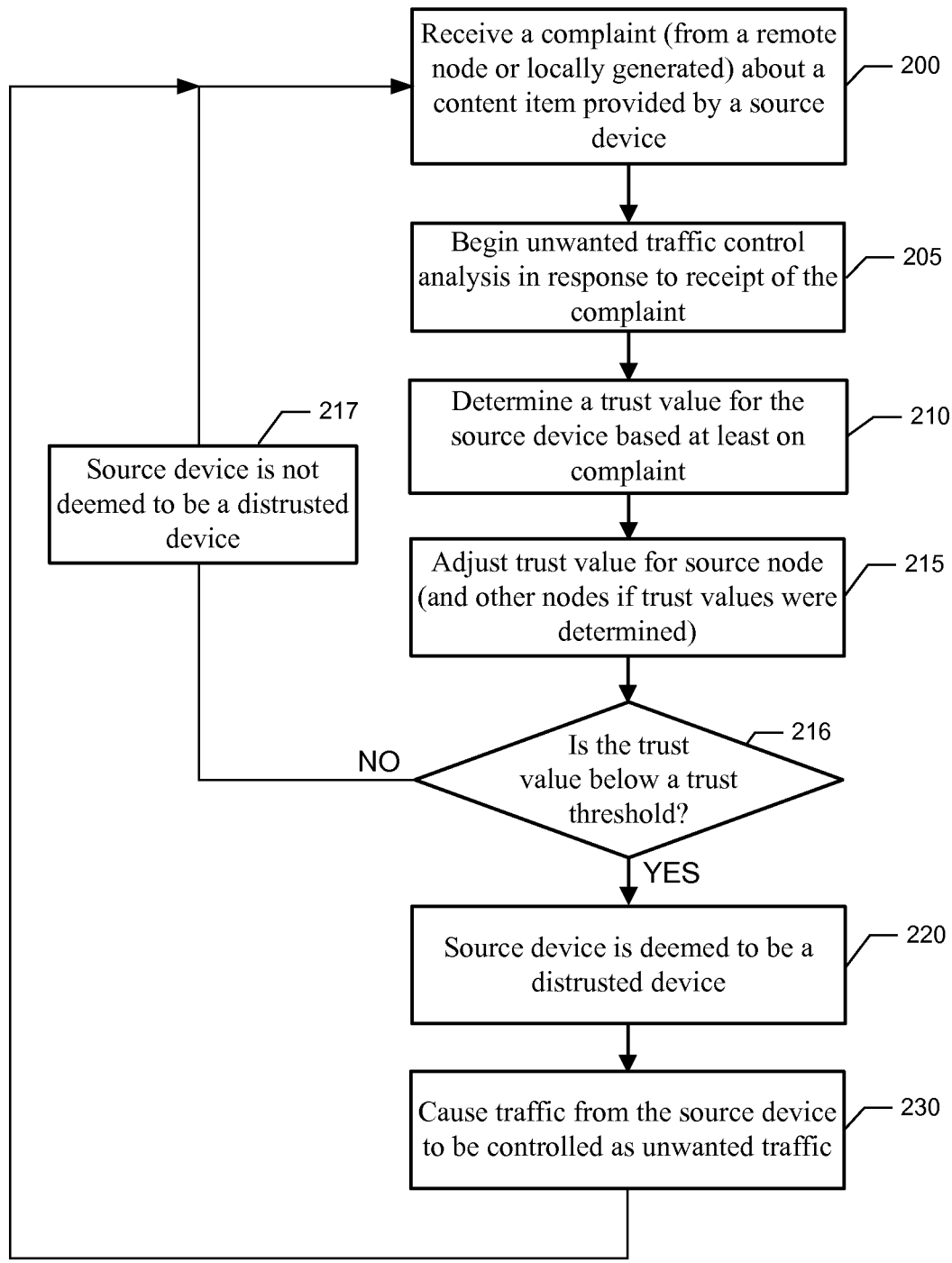
Figure 3:
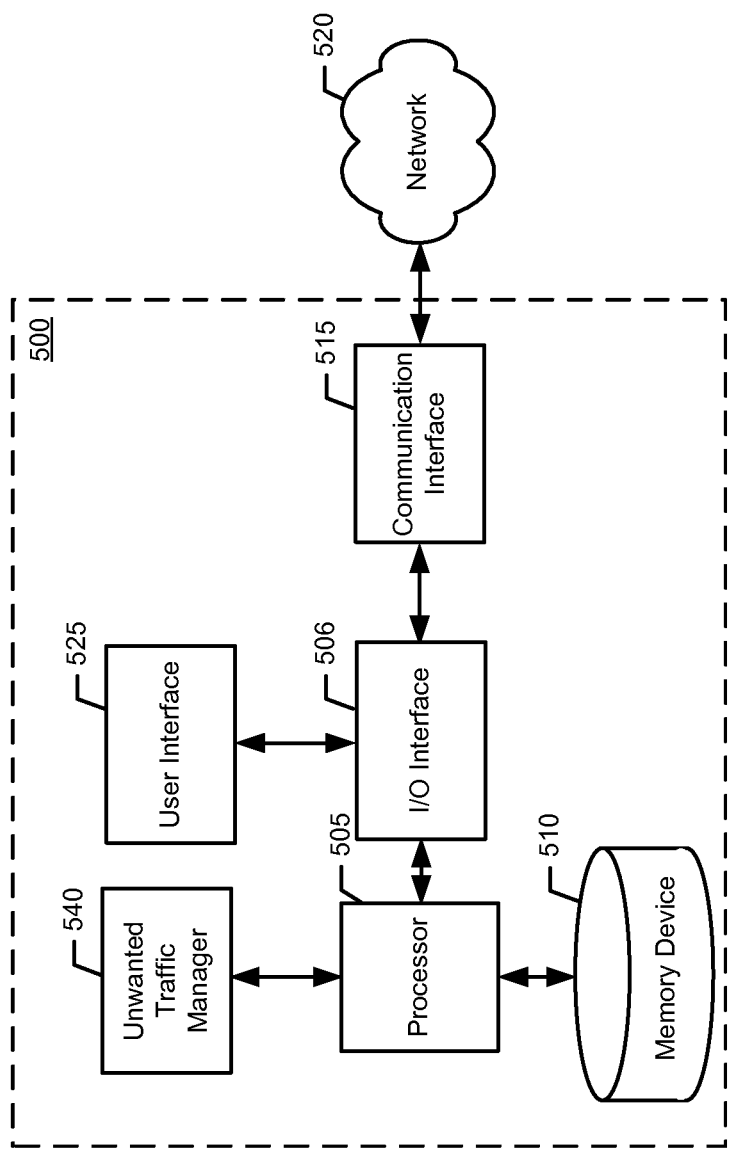
Figure 4:
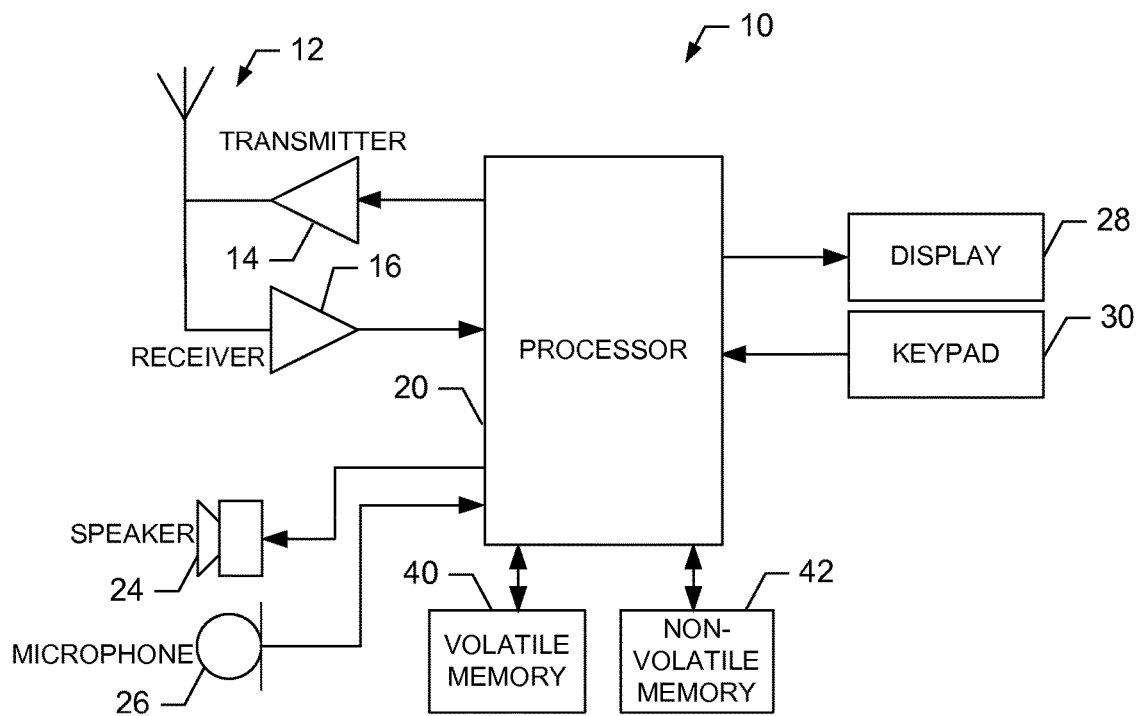

Having thus described some example embodiments in general terms, reference will now be made to the accompanying drawings, which are not necessarily drawn to scale, and wherein:

FIG. 1 illustrates an example flowchart for local detection and complaint broadcasting according to an example embodiment;

FIG. 2 illustrates an example flowchart for unwanted traffic control according to an example embodiment;

FIG. 3 illustrates a block diagram of an apparatus and associated system for unwanted traffic management according to some example embodiments; and FIG. 4 illustrates a block diagram of a mobile device configured to implement unwanted traffic management according to some example embodiments.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Various example embodiments facilitate the managing of unwanted traffic within a wireless network. Unwanted traffic (or content) may be traffic (or content) that is not expected by the traffic destination or the content consumer. As such, unwanted traffic may be the propagation of malware, communications associated with malware, unsolicited advertising traffic, or the like. In this regard, according to some example embodiments, traffic within a network may be monitored and, upon identifying potential unwanted traffic, a mobile device may be configured to broadcast a complaint to other mobile devices in the network. Further, based on a local detection of the unwanted traffic or in response to a received complaint, a mobile device may be configured to analyze various factors including, but not limited to, a user's rating of the likelihood that a received content item is unwanted traffic, or a time between when a content item is received and when the content item is removed, for example, by deleting the content item or moving the content item to a spam folder or other place for unwanted content. The analysis may involve calculation of a trust value for a source device that provided the alleged unwanted traffic. The calculated trust value may be compared to a trust threshold value, and if the trust value does not exceed the trust threshold, then the content item associated with the unwanted traffic and the source device may be logged. Upon being logged, future traffic originating from the source device may be controlled as unwanted traffic, such as by filtering the traffic.

According to various example embodiments, the wireless network within which unwanted traffic management may be performed in a mobile ad hoc network (MANET). A MANET may be a collection of autonomous nodes (e.g., mobile devices such as smart phones) that communicate with each other by forming a multi-hop radio network. The nodes of the MANET may therefore maintain connectivity in a decentralized manner.

MANETs may be used in a variety of contexts, including, for example, social networking. In particular, MANETs may provide a platform for implementing pervasive social networking (PSN) technologies. Pervasive social networking may involve the integration of online social networking through the use of virtual friend or association lists with physical location-based technologies. For example, a user, having a device connected to the MANET, could query people in the vicinity about nearby sales within a shopping mall, about which movie is recommended to see at the nearby theater, or about which mobile application should be installed for tagging the locations of photos. The user's neighbors within the MANET may respond to these queries by providing their recommendations. As another example, the user could chat, via text or voice, with people nearby about sharing a taxi ride or sharing the cost of a series of movie tickets. At school or in University campus, students may chat with each other in a forum/community, and they may express their opinions to other people during group chatting or bulling. According to various example embodiments, these types of pervasive social networking are very valuable for the mobile users, especially when fixed networks (e.g. Internet) or mobile networks are temporarily unavailable or costly to access, and pervasive social networks may also supply a popular social networking mode in the future.

In pervasive social networking systems, a number of contents and information may be distributed within the network. For example, these contents and information may contain or include a mobile application installation link, a uniform resource locator (URL) of a service, a web page, a textual message typed by a user, or the like. These contents/traffics may therefore involve information that is deemed useful to the users, while other information may not be useful or may even be harmful to devices or the operation of the overall system. Users may, for example, receive unwanted or unexpected contents such as, for example, malwares, viruses and trojans, spammed emails, auto-redirects to a webpage, voice-VoIP (voice over internet protocol) calls, instant messages, SMS (short message service) messages, denial of service attacks, distributed denial of service attacks, or the like. The unwanted traffic or content items may intrude user devices, consume a user's time, consume the device and network resources, occupy a device's memory space, and cause a negative usage experience.

As such, some example embodiments operate to control the propagation of unwanted traffic through a wireless network, to avoid some or all of the negative impacts of unwanted traffic and unwanted content. To do so, according to some example embodiments, complaints about particular content items and source devices may be generated and used to determine which devices within the network should be restricted. As such, a form of trust management may be implemented based on the content processing and maintenance behaviors of mobile users and complaint broadcasts. A distributed solution, according to some example embodiments, is therefore provided where each mobile device may identify a suspect source of unwanted traffic, and control and filter the unwanted traffic and content. In this manner, according to various example embodiments, unwanted traffic or content may be reduced within the overall network, which may be implementing a pervasive social networking solution.

According to various example embodiments, to handle unwanted traffic in the network, mobile devices may be configured to perform local detection and complaint broadcasting, as well as, local control of the unwanted traffic. According to some example embodiments, local detection and complaint broadcasting may be performed in parallel with local control of the unwanted traffic. As further described below, FIG. 1 depicts a flowchart of an example method for local detection and complaint broadcasting according to various example embodiments. The example method of FIG. 1 may be implemented by a mobile device within a wireless network or circuitry, such as a processor of the mobile device. An example method for unwanted traffic control by a mobile device or circuitry of a mobile device is depicted in FIG. 2.

Local detection, as described in FIG. 1, may be conducted automatically in the mobile device. In this regard, the mobile device may monitor, at 100, the device's inbound and outbound traffic in order to detect whether the local device has been infected (e.g., when outbound traffic has sharply increased, for example, above a threshold level) or intruded (e.g., when inbound traffic has become unaffordable to the device in consideration of the device's remaining stored power or power utilization). The device may also monitor, at 110, the user's behavior with respect to a content item, such as a received content item. In this regard, the user's behavior on content maintenance can be monitored. For example, the time between receipt of the content item and removal of the content item (e.g., by deleting, moving to a spam folder, or the like) may be monitored as an indicator of user behavior relative to the content item. According to some example embodiments, this disposal time can be an indicator of unwanted traffic that can be considered by other devices.

Accordingly, local traffic monitoring may be performed with respect to the traffic that is received and transmitted by a user device. The user may be designated as $U_k$ where k=1, . . . , K, and K is the total number of mobile devices in the network or a local section of the network. For user $U_k$, a traffic deviation at time t can be described as $d_t\{tr_k(t)\}$, where $$d_t\{g(t)\} = \frac{g(t) - g(t-\tau)}{\tau},$$

($\tau \to 0$), and where g(t) is a function of variable t. Inbound traffic of $U_k$ may be designated by $tr_k^i(t)$, and outbound traffic may be designated by $tr_k^o(t)$. As such, an the total traffic associated with $U_k$ may be defined as $tr_k(t)=tr_k^i(t)+tr_k^o(t)$.

Having monitored the traffic and the user behavior, an unwanted traffic indicator may be generated at 120. The unwanted traffic indicator may be a combination of an unwanted traffic local indicator $\Phi_k$ and an unwanted traffic behavior indicator $\tau_i$. The unwanted traffic local indicator may be calculated using the expression:

$$\Phi_k(t)=|1-2f\{d_t\{tr_k^i(t)+tr_k^o(t)\}\}| \quad (1)$$

This unwanted traffic local indicator value may be used in later determinations involving control of traffic from a suspect source device. According to some example embodiments, detection may be considered reliable if the device is protected by the trusted computing technology. Herein, f(x) is the Sigmoid function $$f(x) = \frac{1}{1+e^{-x}},$$

which can be used to normalize a value into (0, 1). The unwanted traffic local indicator can indicate a degree of change in traffic. In this regard, the more of a change in the amount of traffic, the more suspicious the activity associated with that is considered. To evaluate the unwanted traffic local indicator, a time window may be selected, since the unwanted traffic local indicator is s function of time.

In addition to local traffic monitoring, unwanted traffic handling may also be performed. In this regard, if the receiving time of a suspicious content $e_i^k$ is $r_t^i$ and the content's removal time (or the time at which the user indicates that the content is unwanted) is $m_t^i$, an unwanted traffic behavior indicator $\tau_i$ contributed by the user's content processing behavior may also be described as:

$$\tau_i = 1 - \frac{m_t^i - r_t^i}{T} \quad (2)$$

where T is the time window used to normalize the content handling time.

At 130, a determination may be made as to whether a suspicious content item is considered unwanted traffic. To do so, the unwanted traffic indicator value, which may be expressed as $\Phi_k^*\tau_i$, may be compared to an unwanted traffic threshold value. For example, if the unwanted traffic indicator value is greater than or exceeds the unwanted traffic threshold value, then the content item may be considered an unwanted content item at 135. If, however, the unwanted traffic indicator value is less than or falls below the unwanted traffic threshold value, then the content item may not be considered an unwanted content item at 136 and the mobile device may continue monitoring traffic and user behavior. Additionally or alternatively, the user may rate the possibility he/she thinks the content item is an unwanted content item, where the rating is indicated as $v_k^i(t)$. The credibility of $v_k^i(t)$, according to some example embodiments, may be based on the user's behavior relative to content handling and local traffic auto-monitoring. According to some example embodiments, if the user's rating exceeds a rating threshold (e.g., indicating that the content item is highly likely to be unwanted content), then the content item may be considered an unwanted content item.

Upon identifying an unwanted content item, a complaint may be generated by a mobile device at 140 to be reported to other mobile devices for consideration. The complaint may be generated to include a variety of information including, but not limited to, the unwanted traffic indicator for the content item, a content item identifier, an identifier of the source device that transmitted the content item, an identifier of the complaining device, or the like. Additionally, in some example embodiments where, for example, a user rating has been provided, the complaint may include an unwanted traffic detection value $s_i^k(t)$ at time t about unwanted content $e_i^k$. In this regard, the unwanted detection value detected by an individual mobile device may be expressed as:

$$s_i^k(t)=v_k^i(t)*\Phi_k*\tau_i \quad (3)$$

At 150, the generated complaint may be broadcast to other devices in the wireless network. In this regard, according to some example embodiments, the complaint may be broadcast within a pervasive social network, for example, via a MANET.

Having described an example procedure for local detection and complaint broadcasting above, TABLE 1 provides an example algorithm for implementing local unwanted traffic detection and complaint broadcasting.

TABLE 1

Algorithm 1: Unwanted Traffic Detection at $U_k$'s Device

1. Input: $tr_k(t)$, $e_i^k$, $r_t^i$, $d_t^i$, $v_k^i(t)$.
2. Monitor $U_k$'s traffic to get $\varphi_k = |1 - 2f\{d_t\{tr_k(t)\}\}|$;
3. For each suspicious content $e_i^k$, do
4.     Calculate $\tau_i$;
5.     If $U_k$ reports with $v_k^i(t)$, calculate $s_i^k(t) = v_k^i(t) * \varphi_k * \tau_i$;
6.     If $v_k^i \geq thr1$ or $\varphi_k * \tau_i \geq thr$,
7.     Broadcast $s_i^k(t) = v_k^i(t) * \varphi_k * \tau_i$ or $\varphi_k * \tau_i$ to other nodes;
9. Output: $s_i^k(t)$; $\varphi_k * \tau_i$, (i = 1,......,$I_{U_k}$).

Now referring to FIG. 2, a flowchart of an example method for unwanted traffic control is provided. In this regard, an occurrence of an unwanted traffic or content may be detected through the receipt of a complaint about a content item provided by a source device at 200. The occurrence of unwanted traffic may be detected within a wireless network such as an ad hoc network, a MANET, or a pervasive social network being implemented on a MANET. The complaint may be received from a remote device within the network or generated and received locally based on a local detection. In this regard, each device in the network may form a collection of complaints to be analyzed. Upon detecting the occurrence of unwanted traffic through receipt of a complaint, a traffic control analysis may be undertaken at 205.

At 210, a trust value may be determined by a mobile device for the source device of the unwanted content item. According to some example embodiments, the trust value may be determined based on user ratings indicating the likelihood that the content item is unwanted content. Further, both local detections and complaints received from other devices may be considered together in order to determine the trust value of the source node. In this regard, user $U_k$(k=1, ..., K1) could rate $e_i^k$ more than once and at different times t: $\{V_k^i\}=\{V_k^i(t)\}$. According to various example embodiments, in consideration of how time may influence the outcome and a potential for on-off and ballot stuffing attacks, a user's most recent rating may be utilized in the analysis. For a user $U_{k'}$, that is the source device for the unwanted content item, the complaints regarding that user may be aggregated from K1 users with ratings $V_k^i(t)$ as:

$$rt_{k'}^{tp} = \frac{\sum_{k=1}^{K1} ut_k^{tp} * v_k^i(t) * \varphi * \tau_i * e^{-\frac{|t-t_p|^2}{\rho}}}{\sum_{k=1}^{K1} ut_k^{tp} * \varphi * \tau_i * e^{-\frac{|t-t_p|^2}{\rho}}} \quad (4)$$

where $ut_k^{tp}$ is the current trust value of $U_k$, $v_k^i(t)$ is the users rating on $e_i^k$ at time t, $t_p$ is the trust evaluation time, and $\rho$ is a parameter to control the time decaying. $rt_{k'}^{tp}$ may therefore be the aggregation value based on the complaints from K1 users with ratings $V_k^i(t)$.

In some example embodiments, complaints may be received that do not include a user rating. For example, complaints triggered based upon an unwanted traffic indicator may be broadcast without a user rating, as described above. These complaints may also be aggregated. To aggregate the complaints without ratings from K2 users, the following expression may be used:

$$wt_{k'}^{tp} = \frac{\sum_{k=1}^{K2} ut_k^{tp} * \varphi * \tau_i}{\sum_{k=1}^{K2} ut_k^{tp}} \quad (5)$$

where $wt_{k'}^{tp}$ is the aggregation value based on the complaints from K2 users without user ratings.

In addition to determining the aggregations of complaints, the unwanted traffic behavior indicators may also be considered. The removal time may therefore be considered in determining the trust value. In this regard, or each content item sourced from $U_{k'}$, the following may be calculated:

$$\tau_i = 1 - \frac{m_t^i - r_t^i}{T}; \quad (6)$$

$$\tau = \frac{1}{I_{k'}} \sum_{i=1}^{I_{k'}} \tau_i$$

These results may then be further combined in order to evaluate $U_{k'}$'s trust value:

$$ut_{k'}^{tp} = ut_{k'}^{tp} - \theta(K1+K2)(\alpha * wt_{k'}^{tp} + \beta * rt_{k'}^{tp}) - \gamma\tau \quad (7)$$

where, $\alpha$, $\beta$ and $\gamma$ are weighting factors that can be set based on a practical situation. For example, $\alpha$, $\beta$, and $\gamma$ may be set as:

$$\alpha = \frac{K1}{K1+K2+1}; \beta = \frac{K2}{K1+K2+1}; \gamma = \frac{1}{K1+K2+1} \quad (8)$$

Alternatively, $\alpha$, $\beta$, and $\gamma$ may be set as:

$$\alpha = \frac{\theta(K1)}{\theta(K1)+\theta(K2)+\theta(1)}; \beta = \frac{\theta(K2)}{\theta(K1)+\theta(K2)+\theta(1)}, \quad (9)$$

$$\gamma = \frac{\theta(1)}{\theta(K1)+\theta(K2)+\theta(1)}$$

where $$\theta(I) = \left\{1 - \exp\left(\frac{-I^2}{2\sigma^2}\right)\right\},$$

the Rayleigh cumulative distribution function to model the impact of I. Herein, the number of complaints may be considered by modeling their influence using the Rayleigh cumulative distribution function as $\theta(K1+K2)$.

Upon determining the trust value for the source device, or any other devices that may have been analyzed with respect to trust, the trust values may be adjusted at 215. In this regard, the trust values may be adjusted in a trust value log of devices that the mobile device has interacted with by either receiving a complaint about the device or receiving a complaint from the device.

Additionally, a determination may be made as to whether the source device is a distrusted device at 216. In this regard, the determined trust value may be compared to a trust threshold to determine whether the source device is trusted or distrusted. In some example embodiments, if the trust value is less than the trust threshold, then the source device is deemed to be distrusted at 220. On the other hand, if the trust value exceeds the trust threshold, then the source device may not be deemed to be distrusted at 217, and the mobile device may await further complaints. Upon determining that the source device is distrusted, the result may logged (e.g., the identifier of the distrusted device may be added to a black list). The content item identifier may also be logged, for example, on the black list. Further, a mobile device, having determined that the source device is distrusted, may cause traffic from the source device to be controlled as unwanted traffic at 230. In this regard, the mobile device may filter, or move to a spam folder some or all traffic originating from the distrusted source device. Other forms of control that may be implemented include filtering contents from the untrustworthy devices, dropping data packages sourced from the untrustworthy devices, not responding to messages from the untrustworthy nodes, and the like.

Having described an example procedure for unwanted traffic control above, TABLE 2 provides an example algorithm for implementing unwanted traffic control.

TABLE 2

Algorithm 2: Trust Evaluation and Unwanted Traffic Control

1. Input: $ut_k^t$, $\tau_i$; $v_k^i(t)$; $\varphi_{ki}$; (i = 1,......,$I_{U_k}$).
3. For each complained user $U_{k'}$, do
4.    Calculate $rt_{k'}^t$, $wt_{k'}^t$, and $ut_{k'}^t$ based on (4-7)
5.    If $ut_{k'}^t \le thr2$, filter the traffic sourced from $U_{k'}$, conduct traffic control on $U_{k'}$
6. Output: blacklist of unwanted traffic sources $U_{k'}$.

Additionally, according to some example embodiments, the credibility of complaints may be considered in the determination of a trust value for a source device. In this regard, if a mobile device within the network is exploiting the unwanted traffic management system by generating false complaints, the credibility of the complaints may be considered to avoid the improper designation of a device as a distrusted or trusted device. Each device may therefore evaluate the credibility of complaints from other devices in order to fight against malicious behaviors of other devices that may be caused for any number of reasons. For example, this may occur when a device is intruded, when the device is used maliciously, when the detection tools installed in the device are corrupted or intruded, when there is no trusted computing platform support at the device, when the detection tools are insufficient and the detection is not qualified, or the like. Accordingly, another dimension of trust may be introduced through the use of a credibility value with respect to the credibility of complaints provided by a mobile device.

The credibility value of $U_k$ may be generated as follows. If $U_k$'s broadcast complaint is determined to be false, then $y=-1$, and $\gamma$++ (incremented). To determine whether a complaint is false, the black list may be consulted to determine whether a complaint is provided by a distrusted device or whether a content item appears on the black list. If the complaint is determined to be true, then $y=1$ and $\gamma$ remains unchanged. The credibility value of $U_k$ at time t, $dt_k^t$, is:

$$dt_k^t = \begin{cases} dt_k^t + \delta y & (\gamma < thr3) \\ dt_k^t + \delta y - \mu\gamma & (\gamma \ge thr3) \end{cases} = \begin{cases} 1 & (dt_k^t > 1) \\ 0 & (dt_k^t < 0) \end{cases} \quad (10)$$

where $\delta > 0$ is a parameter to control the adjustment of $dt_k^t$. In order to detect on-off and conflict behavior attackers, the warning flag $\gamma$ may be used to record the number of bad detections by a device. $\gamma$'s initial value may be set to 0, and may be increased by 1 each time a false complaint is identified. Additionally, thr3 may be a threshold to indicate on-off and conflict behavior attacks, and $\mu > 0$ may be a parameter to control bad detection punishment.

The credibility value may be adopted if trustworthy unwanted traffic detection cannot be ensured in the mobile devices. The following incorporates the credibility value into the determination of a trust value for a device.

$$rt_{k'}^{tp} = \frac{\sum_{k=1}^{K1} dt_k^{tp} * ut_k^{tp} * v_k^i(t) * \varphi * \tau_i * e^{-\frac{|t-t_p|^2}{\rho}}}{\sum_{k=1}^{K1} dt_k^{tp} * ut_k^{tp} * \varphi * \tau_i * e^{-\frac{|t-t_p|^2}{\rho}}} \quad (11)$$

$$wt_{k'}^{tp} = \frac{\sum_{k=1}^{K2} dt_k^{tp} * ut_k^{tp} * \varphi * \tau_i}{\sum_{k=1}^{K2} dt_k^{tp} * ut_k^{tp}} \quad (12)$$

$$ut_{k'}^{tp} = ut_{k'}^{tp} - \theta(K1 + K2)(\alpha * wt_{k'}^{tp} + \beta * rt_{k'}^{tp}) * \tau \quad (13)$$

Having described an example procedure for unwanted traffic control based on a credibility value above, TABLE 3 provides an example algorithm for implementing unwanted traffic control based on a credibility value.

TABLE 3

Algorithm 3: Trust Evaluation and Unwanted Traffic Control by considering each device's credibility value 1. Input: $ut_k^t$, $\tau_i$; $v_k^i(t)$; $\varphi_{ki}$; (i = 1,......,$I_{U_k}$).
2. For each complained user $U_{k'}$, do
3.    Calculate $rt_{k'}^t$, $wt_{k'}^t$, and $ut_{k'}^t$ based on (11-13)
4.    If $ut_{k'}^t \le thr2$, put $U_{k'}$ (and its contents) into the blacklist, filter the traffic sourced from $U_{k'}$, and conduct traffic control on $U_{k'}$
5. Update each node's detection trust based on (10).
6. Output: blacklist of unwanted traffic sources $U_{k'}$.

As such, various example embodiments for unwanted traffic management are provided above and otherwise herein. Some example embodiments provide a solution with increased usability that supports automatic unwanted traffic detection and control based on user behavior monitoring and traffic monitoring, where user participation is optional and may be discerned through typical user-device interaction. Further, some example embodiments provide a solution that is automatic and potentially transparent to the user, but one that supports an unwanted traffic control solution within a distributed environment. In this regard, the control may be self-organized by the pervasive social networking devices with no requirement for a centralized party (e.g., internet service provider or operator). Additionally, according to some example embodiments, a resource affordable solution is provided where a complaint message may contain the unwanted traffic/content source ID, content ID (e.g., hash code of the content), and a locally generated unwanted detection value $s_i^k(t)=v_k^i(t)*\Phi_k*\tau_i$ or unwanted traffic indicator $\Phi_k*\tau_i$, thereby resulting in a minimal increase in traffic load. Further, according to various example embodiments, the unwanted traffic control mechanism may also have the advantage of being securely protected by the mobile device platform.

Having described at least some of the example method embodiments, FIGS. 3 and 4 depict example apparatuses that may be configured to perform various functionalities as described herein, including those described with respect to operations described above and with respect to FIGS. 1 and 2. Referring now to FIG. 3, an example embodiment is depicted as apparatus 500, which may be embodied as a wireless communications device. In some example embodiments, the apparatus 500 may be embodied as, or included as a component of, a communications device with communications capabilities. In some example embodiments, the apparatus 500 may be part of a communications device, such as a stationary or a mobile communications device. As a mobile device, the apparatus 500 may be a mobile and/or wireless communications node such as, for example, a mobile and/or wireless server, computer, access point, handheld wireless device (e.g., telephone, tablet device, portable digital assistant (PDA), mobile television, gaming device, camera, video recorder, audio/video player, radio, digital book reader, and/or a global positioning system (GPS) device), any combination of the aforementioned, or the like. Regardless of the type of communications device, apparatus 500 may also include computing capabilities.

FIG. 3 illustrates a block diagram of example components of the apparatus 500. The example apparatus 500 may comprise or be otherwise in communication with a processor 505, a memory device 510, an Input/Output (I/O) interface 506, a communications interface 515, a user interface 525, and an unwanted traffic manager 540. The processor 505 may, according to some example embodiments, be embodied as various means for implementing the various functionalities of example embodiments including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 may be configured to execute instructions stored in the memory device 510 or instructions otherwise accessible to the processor 505. The processor 505 may be configured to operate such that the processor causes or directs the apparatus 500 to perform various functionalities described herein.

Whether configured as hardware or via instructions stored on a computer-readable storage medium, or by a combination thereof, the processor 505 may be an entity and means capable of performing operations according to example embodiments while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., mobile communications device) configured for employing example embodiments by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 comprises Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), various type of solid-state storage (e.g., flash memory), and/or the like. Memory device 510 may include a cache area for temporary storage of data. In this regard, some or all of memory device 510 may be included within the processor 505. In some example embodiments, the memory device 510 may be in communication with the processor 505 and/or other components via a shared bus. In some example embodiments, the memory device 510 may be configured to provide secure storage of data, such as, for example, the characteristics of the reference marks, in trusted modules of the memory device 510.

Further, the memory device 510 may be configured to store information, data, applications, computer-readable program code instructions, and/or the like for enabling the processor 505 and the example apparatus 500 to carry out various functions in accordance with example embodiments described herein. For example, the memory device 510 may be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the I/O interface may embody or be in communication with a bus that is shared by multiple components. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities.

In some embodiments, the apparatus 500 or some of the components of apparatus 500 (e.g., the processor 505 and the memory device 510) may be embodied as a chip or chip set. In other words, the apparatus 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 500 may therefore, in some cases, be configured to implement embodiments on a single chip or as a single "system on a chip." As such, in some cases, a chip or chipset may constitute means for performing the functionalities described herein and with respect to the processor 505.

The communication interface 515 may be any device or means (e.g., circuitry) embodied in hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that supports cellular communications. According to various example embodiments, the communication interface 515 may be configured to support the transmission and reception of communications in a variety of networks including, but not limited to Internet Protocol-based networks (e.g., the Internet), cellular networks, or the like. Further, the communications interface 515 may be configured to support device-to-device communications, such as in a mobile ad hoc network (MANET). Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical, or other output indications. The user interface 525 may include, for example, a keyboard, a mouse, a joystick, a display (e.g., a touch screen display), a microphone, a speaker, camera, accelerometer, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

The unwanted traffic manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the unwanted traffic manager 540 as described herein. In an example embodiment, the processor 505 comprises, or controls, the unwanted traffic manager 540. The unwanted traffic manager 540 may be, partially or wholly, embodied as processors similar to, but separate from processor 505. In this regard, the unwanted traffic manager 540 may be in communication with the processor 505. In various example embodiments, the unwanted traffic manager 540 may, partially or wholly, reside on differing apparatuses such that some or all of the functionality of the unwanted traffic manager 540 may be performed by a first apparatus, and the remainder of the functionality of the unwanted traffic manager 540 may be performed by one or more other apparatuses.

Further, the apparatus 500 and the processor 505 may be configured to perform various functionalities via unwanted traffic manager 540. In this regard, the unwanted traffic manager 540 may be configured to implement the operations described herein. For example, the unwanted traffic manager 540 may be configured to implement the operations 100, 110, 120, 130 and 140 of FIG. 1 and the variations of those and related operations described herein. Further, the unwanted traffic manager 540 may be configured to implement the operations 200, 210, 220, and 230 of FIG. 2 and the variations of those and related operations.

Referring now to FIG. 4, a more specific example apparatus in accordance with various embodiments is provided. The example apparatus of FIG. 4 is a mobile device 10 configured to communicate within a wireless network, such as a cellular communications network. The mobile device 10 may be configured to perform the functionality of the mobile device 100 or apparatus 500 as described herein. More specifically, the mobile device 10 may be caused to perform the functionality described with respect to FIGS. 1 and 2 and other described above, via the processor 20. In this regard, according to some example embodiments, the processor 20 may be configured to perform the functionality described with respect to the unwanted traffic manager 540. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile device 10 may also include an antenna 12, a transmitter 14, and a receiver 16, which may be included as parts of a communications interface of the mobile device 10. The speaker 24, the microphone 26, display 28 (which may be a touch screen display), and the keypad 30 may be included as parts of a user interface.

FIGS. 1 and 2 illustrate flowcharts of example systems, methods, and/or computer program products according to example embodiments. It will be understood that each operation of the flowcharts, and/or combinations of operations in the flowcharts, can be implemented by various means. Means for implementing the operations of the flowcharts, combinations of the operations in the flowchart, or other functionality of example embodiments described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of 1 and 2 and otherwise described herein may be stored on a memory device, such as memory device 510, volatile memory 40, or volatile memory 42, of an example apparatus, such as example apparatus 500 or mobile device 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   detecting, at a mobile device, a content item provided by a source device;
   receiving a complaint generated by a reporting mobile device about the content item, wherein the complaint indicates a likelihood that the content item is unwanted, and wherein the reporting mobile device generates the complaint by
      monitoring at least one of an inbound traffic and an outbound traffic of the reporting mobile device;
      monitoring at least one action performed in response to the content item;
      generating an unwanted traffic indicator value, the unwanted traffic indicator value being a combination of an unwanted traffic local indicator being indicative of an amount of change in traffic during a predetermined period of time, wherein an increase in the amount of change in traffic is indicative of a suspicious activity by the source device, and an unwanted traffic behavior indicator, the unwanted traffic behavior indicator is determined based on a time difference between a receipt of the content item and performing the at least one action, wherein the at least one action includes at least one of the following: an indication that the content item is unwanted and a removal of the content item;
      generating the complaint about the content item and the source device when a comparison between the unwanted traffic indicator value and an unwanted traffic threshold value indicates that the content item is unwanted; and
      broadcasting the complaint;
   determining, at the mobile device, a trust value for the source device based on at least:
      the received complaint, and
      a credibility of the reporting mobile device, wherein the credibility is based on whether the reporting mobile device is included on a list of distrusted devices, wherein the reporting mobile device is included in the list of distrusted devices based on at least a number of false complaints generated by the reporting mobile device, and wherein when the reporting mobile device is on the list, the complaint is deemed a false complaint;
   determining, at the mobile device, that the source device is distrusted based on at least a comparison between the trust value and a trust threshold value; and
   controlling traffic from the source device to reduce unwanted content based on the determining that the source device is distrusted, wherein the controlling includes filtering at least a portion of the traffic from the source device;

designating at least a portion of the traffic from the source device as spam;

dropping, based on the designating, at least one data package from the at least a portion of the traffic from the source device; and transmitting at least another portion of the traffic excluding the at least a portion designated as spam.

2. The method of claim 1, wherein a credibility value is further determined based on at least a previously broadcast complaint by the mobile device.

3. The method of claim 1, wherein the detecting the content further comprises detecting the content within a wireless network that is an ad hoc network.

4. The method of claim 1, wherein the content is within a mobile ad hoc network, wherein the content is within a social networking application, and wherein the content includes a location.

5. The method of claim 1, wherein the trust value is based on at least a removal time, wherein the removal time is a duration of time value calculated as a difference in time between when the content item was received and when the user removed the content item.

6. The method of claim 1, wherein the complaint includes a user rating for the content item.

7. An apparatus comprising:
at least one processor; and
at least one memory including computer program code, the at least one processor, the at least one memory, and the computer program code configured to cause the apparatus at least to:
detect, at the apparatus, a content item provided by a source device;
receive a complaint generated by a reporting mobile device about the content item, wherein the complaint indicates a likelihood that the content item is unwanted, and wherein the reporting mobile device generates the complaint by
monitoring at least one of an inbound traffic and an outbound traffic of the reporting mobile device;
monitoring at least one action performed in response to the content item;
generating an unwanted traffic indicator value, the unwanted traffic indicator value being a combination of an unwanted traffic local indicator being indicative of an amount of change in traffic during a predetermined period of time, wherein an increase in the amount of change in traffic is indicative of a suspicious activity by the source device, and an unwanted traffic behavior indicator, the unwanted traffic behavior indicator is determined based on a time difference between a receipt of the content item and performing the at least one action, wherein the at least one action includes at least one of the following: an indication that the content item is unwanted and a removal of the content item;
generating the complaint about the content item and the source device when a comparison between the unwanted traffic indicator value and an unwanted traffic threshold value indicates that the content item is unwanted; and
broadcasting the complaint;

determine, at the apparatus, a trust value for the source device based on at least:
the received complaint, and
a credibility of the reporting mobile device, wherein the credibility is based on whether the reporting mobile device is included on a list of distrusted devices, wherein the reporting mobile device is included in the list of distrusted devices based on at least a number of false complaints generated by the reporting mobile device, and wherein when the reporting mobile device is on the list, the complaint is deemed a false complaint;
determine, at the apparatus, that the source device is distrusted based on at least a comparison between the trust value and a trust threshold value; and
control traffic from the source device to reduce unwanted content based on the determining that the source device is distrusted, wherein the control of the traffic includes
filtering at least a portion of the traffic from the source device;
designating at least a portion of the traffic from the source device as spam;
dropping, based on the designating, at least one data package from the at least a portion of the traffic from the source device; and
transmitting at least another portion of the traffic excluding the at least a portion designated as spam.

8. The apparatus of claim 7, wherein a credibility value is further determined based on at least a previously broadcast complaint by the apparatus.

9. The apparatus of claim 7, wherein the apparatus is further configured to at least detect the content the content within a wireless network that is an ad hoc network.

10. The apparatus of claim 7, wherein the content is within a mobile ad hoc network, wherein the content is within a social networking application, and wherein the content includes a location.

11. The apparatus of claim 7, wherein the trust value is based on at least a removal time, wherein the removal time is a duration of time value calculated as a difference in time between when the content item was received and when the user removed the content item.

12. The apparatus of claim 7, wherein the trust value includes a user rating for the content item.

13. The apparatus of claim 7, wherein the apparatus comprises a mobile device.

14. The apparatus of claim 13, wherein the apparatus further comprises communications interface circuitry including an antenna configured to support a connection to an ad hoc network.

15. A non-transitory computer readable medium that, when executed by at least one processor, causes operations comprising:
detecting, at a mobile device, a content item provided by a source device;
receiving a complaint generated by a reporting mobile device about the content item, wherein the complaint indicates a likelihood that the content item is unwanted, and wherein the reporting mobile device generates the complaint by
monitoring at least one of an inbound traffic and an outbound traffic of the reporting mobile device;
monitoring at least one action performed in response to the content item;

generating an unwanted traffic indicator value, the unwanted traffic indicator value being a combination of an unwanted traffic local indicator being indicative of an amount of change in traffic during a predetermined period of time, wherein an increase in the amount of change in traffic is indicative of a suspicious activity by the source device, and an unwanted traffic behavior indicator, the unwanted traffic behavior indicator is determined based on a time difference between a receipt of the content item and performing the at least one action, wherein the at least one action includes at least one of the following: an indication that the content item is unwanted and a removal of the content item;

generating the complaint about the content item and the source device when a comparison between the unwanted traffic indicator value and an unwanted traffic threshold value indicates that the content item is unwanted; and broadcasting the complaint;

determining, at the mobile device, a trust value for the source device based on at least:

the received complaint, and a credibility of the reporting mobile device, wherein the credibility is based on whether the reporting mobile device is included on a list of distrusted devices, wherein the reporting mobile device is included in the list of distrusted devices based on at least a number of false complaints generated by the reporting mobile device, and wherein when the reporting mobile device is on the list, the complaint is deemed a false complaint;

determining, at the mobile device, that the source device is distrusted based on at least a comparison between the trust value and a trust threshold value; and controlling traffic from the source device to reduce unwanted content based on the determining that the source device is distrusted, wherein the controlling includes filtering at least a portion of the traffic from the source device designating at least a portion of the traffic from the source device as spam;

dropping, based on the designating, at least one data package from the at least a portion of the traffic from the source device; and transmitting at least another portion of the traffic excluding the at least a portion designated as spam.

16. The non-transitory computer readable medium of claim 15, wherein a credibility value is based on at least a previously broadcast complaint by the mobile device.

17. The non-transitory computer readable medium of claim 15, wherein the content is within a wireless network that is an ad hoc network.

18. The non-transitory computer readable medium of claim 15, wherein the content is within a mobile ad hoc network, wherein the content is within a social networking application, and wherein the content includes a location.

19. The non-transitory computer readable medium of claim 15, wherein the trust value is based on at least a removal time, wherein the removal time is a duration of time value calculated as a difference in time between when the content item was received and when the user removed the content item.

20. The non-transitory computer readable medium of claim 15, wherein the complaint includes a user rating for the content item.

21. The method of claim 1, wherein a false complaint is a complaint corresponding to a trusted device or to a wanted content.

22. The method of claim 1, wherein credibility is further based on a value of false complaints associated with the reporting mobile device.

23. The method of claim 1, wherein the credibility is further based on whether the content item is included on a list of unwanted content.

* * * * *